United States Patent [19]

Hall

[11] Patent Number: 5,241,772
[45] Date of Patent: Sep. 7, 1993

[54] CYLINDRICAL HUNTING BLIND

[76] Inventor: Rocky A. Hall, P.O. Box 1340, Henderson, Tex. 77653

[21] Appl. No.: 846,206

[22] Filed: Mar. 4, 1992

[51] Int. Cl.5 ............................................. A01M 31/02
[52] U.S. Cl. .......................................... 43/1; 135/901; 135/117; 49/40; 49/404
[58] Field of Search ............... 135/901, 117, 900, 902, 135/90, 87; 43/1; 49/40, 404; 52/263

[56] References Cited

U.S. PATENT DOCUMENTS

| 2,594,410 | 4/1952 | Feldpausch | 135/5 |
| 2,854,705 | 10/1958 | McClaran | 20/2 |
| 2,992,503 | 7/1961 | Webb | 43/1 |
| 3,050,211 | 8/1962 | Hutterer | 49/40 X |
| 3,169,543 | 2/1965 | McGerty | 135/1 |
| 3,220,766 | 11/1965 | Kates | 135/901 X |
| 3,540,170 | 11/1970 | Flowers | 43/1 X |
| 3,570,073 | 3/1971 | Kashuba | 135/901 X |
| 4,282,689 | 8/1981 | Royer | 49/40 X |
| 4,364,193 | 12/1982 | Visco | 43/1 |
| 4,412,398 | 11/1983 | Garmon | 43/1 |
| 4,606,142 | 8/1986 | Reneau | 43/1 |
| 4,719,716 | 1/1988 | Chrisley, Jr. | 43/1 |
| 4,777,755 | 10/1988 | Colburn | 43/1 |
| 5,102,179 | 4/1992 | Royer | 43/1 X |

FOREIGN PATENT DOCUMENTS 8603319 7/1988 Netherlands ......................... 52/2.18

OTHER PUBLICATIONS

Brochure by Strong Built Inc., P.O. Box 157 Waterproof, La. 71375–Late 1991–Early 1992.

Primary Examiner—Carl D. Friedman
Assistant Examiner—Lan M. Mai
Attorney, Agent, or Firm—Kenneth A. Roddy

[57] ABSTRACT

A hollow cylindrical hunting blind that can be supported on the ground or on a tower is formed of elongate arcuate panels and a domed roof which, in a preferred embodiment, have surface corrugations simulating the bark of a tree. A ladder-stand connected to the tower can be easily disconnected from the tower to serve as a leaning tree stand. Lower windows provide a view of the surroundings from a seated position and smaller peep windows above the lower windows provide a view from a standing position. The lower windows slide to cover the window opening in a closed position and completely uncover the window opening in a fully open position, and can be maintained at selective positions between the fully closed and fully open positions. A flexible cable having a control knob located between the windows opens and closes the windows without noise or visible arm movement. The domed roof has a rain channel formed therein to capture and direct rain water downwardly and outwardly between the windows. One or more swivel chairs movably mounted in the enclosure are capable of revolving 360° about the center of the enclosure such that each chair can be selectively positioned closely adjacent the interior side wall of the blind to provide maximum leg room within the blind and provide the chair occupant quick and convenient access to each window in a seated position.

14 Claims, 7 Drawing Sheets

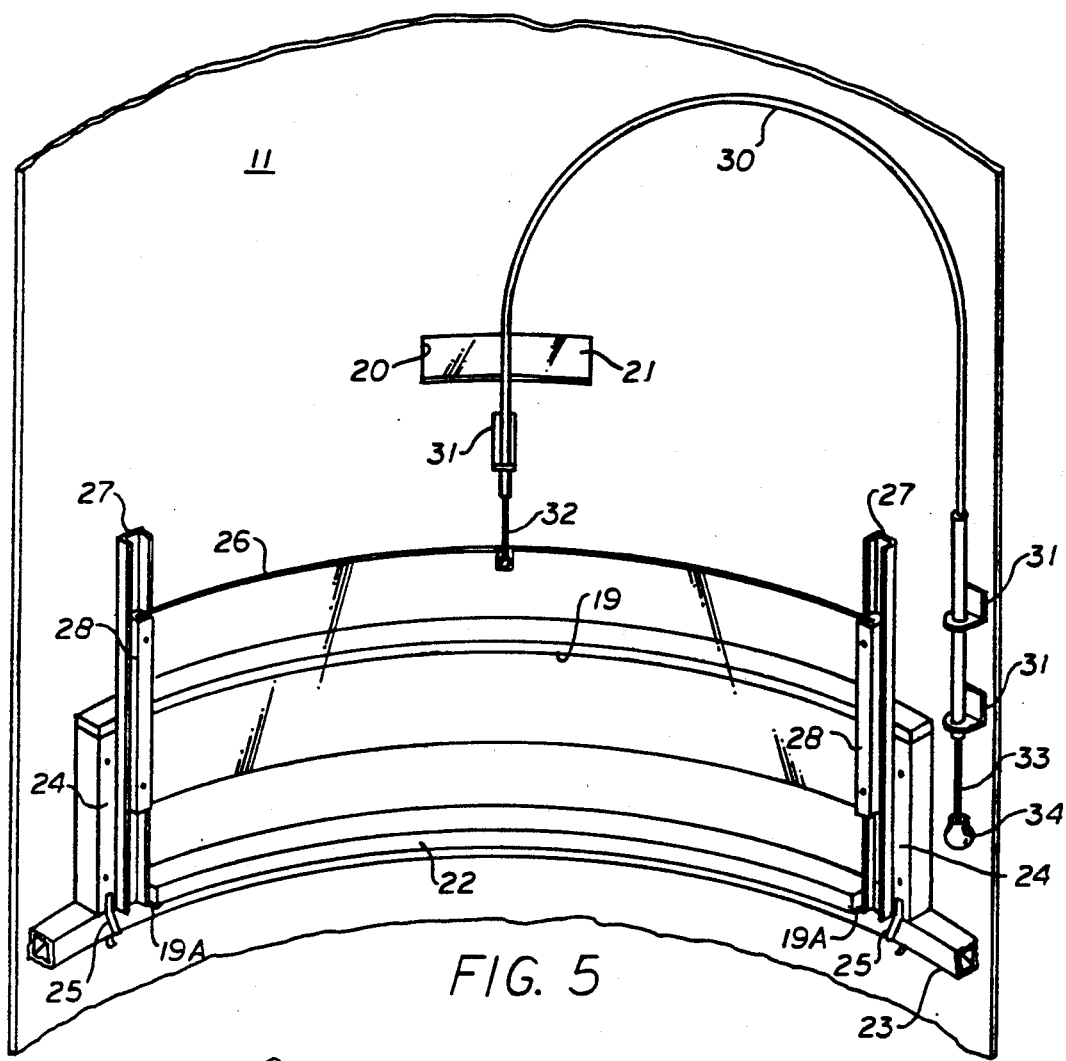
FIG. 5
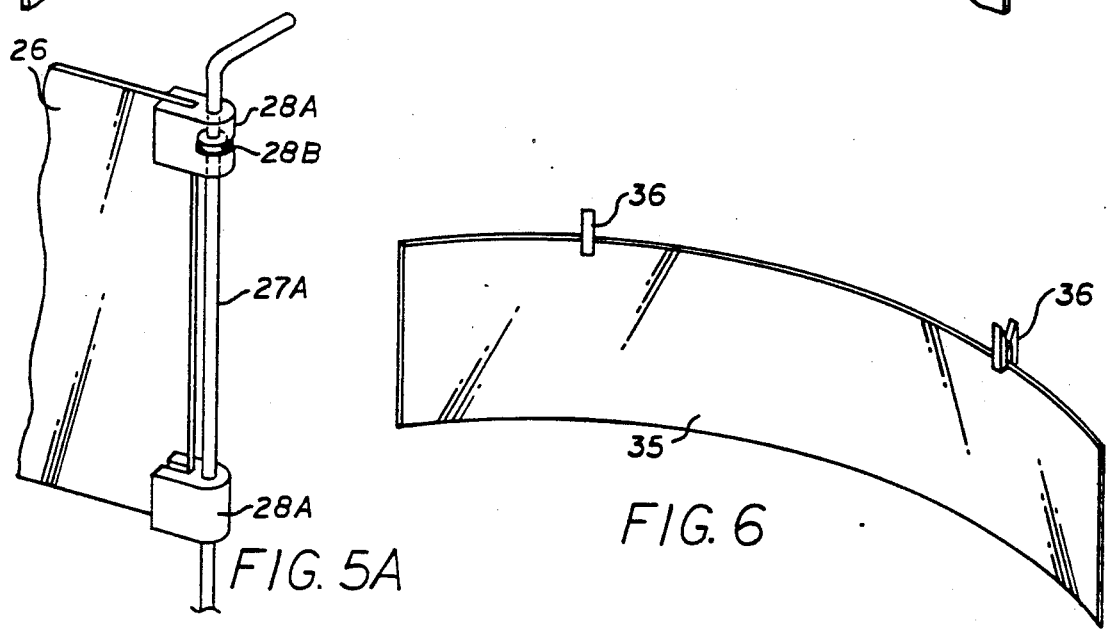
FIG. 5A
FIG. 6

CYLINDRICAL HUNTING BLIND

BACKGROUND OF THE INVENTION

1. Field of the Invention

This invention relates generally to hunting blinds and stands, and more particularly to a cylindrical hunting blind supported on the ground or on a tower and has an outer surface adapted to blend in with the surroundings, sliding windows, a revolving swivel seating system, and a ladder-stand removably connected to the tower which can be used as a leaning tree stand.

2. Brief Description of the Prior Art

Hunting blinds and stands used by hunters are commonly made of wood or fabric materials and often painted or otherwise camouflaged to blend with the trees and foliage of the environment to conceal the occupants from the game they are hunting. Some hunting blinds and stands require the hunter to assume an uncomfortable crouched or sitting position and then stand to shoot as the animal approaches the stand, while others have windows or flaps which pivot outwardly or upwardly in order to provide visibility or to aim the gun at the game. This movement can be seen by animals and will often frighten them away.

There are several patents which disclose hunting blinds and stands of various construction.

Chrisley, Jr., U.S. Pat. No. 4,719,716 discloses a cylindrical hunting blind which has external vertical frame members and a conical overhanging roof. The side wall has window apertures with independently movable curved outer facing window coverings and flat inside facing windows. The outer window coverings and inner windows are hinged to swing upwardly and outwardly and can be opened from inside the blind and the inside windows are held in the vertical position by hook and loop fastener latches. The hunter must reach up and swing the windows up and this reaching and swinging movement can be seen by the animals. The outer window is a sheet of wood and can flap in a strong breeze which can also be seen by animals and may frighten them away.

Webb, U.S. Pat. No. 2,992,503 discloses a generally cylindrical game blind resembling a tree stump formed of curved panels having an outside surface simulating the bark of a tree, a convex top cover rotatably connected thereto, and a hinged door pivoted at its bottom. The hunter must climb into the blind over the door opening, raise the door to close it, squat down and pivot the roof overhead, and assume a crouched position while waiting for animals. To stand erect or to shoot the game, the hunter must rotate the roof outwardly of the stump side wall. This sudden rotation of the roof and standing of the hunter can be seen by the animals and will frighten them away.

Harmon, U.S. Pat. No. 4,412,398 discloses a cylindrical canvas fabric hunting stand which is supported on rods and a rotatable seat mounted on the platform. The canvas structure is open at the top and its height in the extended position will conceal the hunter only in a seated position. This structure also has a seating structure at its center which would inhibit the movement of the occupant.

Visco, U.S. Pat. No. 4,364,193 discloses a portable cylindrical blind of camouflage fabric material having an umbrella portion and a skirt portion which employs an internal frame and seating structure at its center which would inhibit the movement of the occupant.

McGerty, U.S. Pat. No. 3,169,543 discloses a portable canvas shelter having an internal framework comprising a hub and rib member and vertical rods.

Feldpausch, U.S. Pat. No. 2,594,410 discloses a cylindrical canvas fabric hunting stand having a ring at the upper end which is supported on a rod.

McClaran, U.S. Pat. No. 2,854,705 discloses a box-like elevated hunting blind having sliding windows in each of four walls. This type of structure has a limited range of visibility and the sliding windows will only allow half of the window opening to be used for shooting. The arm movement of the occupant when sliding the windows open or closed can be seen by the animals and will frighten them away.

The present invention is distinguished over the prior art in general, and these patents in particular by a hollow cylindrical hunting blind supported on the ground or on a tower that is formed of elongate arcuate panels and a domed roof which, in a preferred embodiment, have surface corrugations simulating the bark of a tree. A ladder-stand connected to the tower can be easily disconnected from the tower to serve as a leaning tree stand. Lower windows provide a view of the surroundings from a seated position and smaller peep windows above the lower windows provide a view from a standing position. The lower windows slide to cover the window opening in a closed position and completely uncover the window opening in a fully open position, and can be maintained at selective positions between the fully closed and fully open positions. A flexible cable having a control knob located between the windows opens and closes the windows without noise or visible arm movement. The domed roof has a rain channel formed therein to capture and direct rain water downwardly and outwardly between the windows. One or more swivel chairs movably mounted in the enclosure are capable of revolving 360° about the center of the enclosure such that each chair can be selectively positioned closely adjacent the interior side wall of the blind to provide maximum leg room within the blind and provide the chair occupant quick and convenient access to each window in a seated position.

SUMMARY OF THE INVENTION

It is therefore an object of the present invention to provide a cylindrical molded hunting blind which may be supported on the ground or on a tower.

It is another object of this invention to provide a cylindrical hunting blind formed of molded panels having surface corrugations molded therein simulating the bark of a tree and which function as reinforcing ribs to strengthen the structure in addition to serving as camouflage for the blind.

It is another object of this invention to provide a cylindrical hunting blind supported on a tower that has a ladder-stand releasably connected to the tower which can be disconnected from the tower to serve as a leaning tree stand and can be easily removed from the tower to prevent unauthorized use of the blind.

Another object of this invention is to provide a cylindrical hunting blind having a plurality of rectangular lower window openings which provide the occupant visibility to the exterior from a seated position and a plurality of smaller window openings above the lower window openings to provide visibility of the surroundings from a standing position.

Another object of this invention is to provide a cylindrical hunting blind having sliding windows which cover the window opening in a fully closed position and completely uncover the window opening in a fully open position, and are capable of being maintained at selective positions between the fully closed and fully open positions.

Another object of this invention is to provide a cylindrical hunting blind having sliding windows mounted on low friction sliding members to provide smooth quiet sliding movement.

Another object of this invention is to provide a cylindrical hunting blind having sliding windows which are moved between the open and closed positions by a remote manual operator located within the enclosure such that the manipulation of the manual operator is not seen through the window openings.

Another object of this invention is to provide a cylindrical hunting blind having sliding windows formed of clear material to allow good vision during prime hunting times when the visibility is poor because of low light conditions and have tinted clip-on window shades which may be used at other times to prevent sun from blinding the occupant and to prevent animals from seeing into the blind.

Another object of this invention is to provide a cylindrical hunting blind having circumferentially spaced windows such that a solid wall is disposed diametrically opposite each window which will prevent light from going straight through the blind whereby a person standing or moving about inside the blind will not be silhouetted by back-lighting when observed through a window.

Another object of this invention is to provide a cylindrical hunting blind having a domed roof with a rain channel formed therein to capture and direct rain water downwardly and outwardly between the windows.

Another object of this invention is to provide a cylindrical hunting blind having one or more swivel chairs movably mounted therein which are capable of revolving 360° about the center of the enclosure such that each chair can be selectively positioned closely adjacent the interior side wall of the blind to provide maximum leg room within the blind and provide the chair occupant quick and convenient access to each window in a seated position.

Another object of this invention is to provide a sliding window system for hunting blinds which have windows which slide easily and quietly on low friction members and are moved between the open and closed positions by a remote manual operator located within the enclosure such that the manipulation of the manual operator is not seen through the window openings.

Another object of this invention is to provide seating system for hunting blinds wherein one or more swivel chairs are capable of revolving 360° about the center of the enclosure such that each chair can be selectively positioned closely adjacent the interior side wall of the blind to provide maximum leg room within the blind and provide the chair occupant quick and convenient access to each window in a seated position.

Another object of this invention is to provide seating system for hunting blinds which can be quickly and easily converted between a single seating system and a dual seating system.

A further object of this invention is to provide a cylindrical hunting blind having one or more swivel chairs movably mounted therein which may be adjusted in height to comfortably accommodate occupants of various size.

A still further object of this invention is to provide a lightweight cylindrical hunting blind which is simple in construction, economical to manufacture and is rugged and durable in use.

Other objects of the invention will become apparent from time to time throughout the specification and claims as hereinafter related.

The above noted objects and other objects of the invention are accomplished by a hollow cylindrical hunting blind supported on the ground or on a tower that is formed of elongate arcuate panels and a domed roof which, in a preferred embodiment, have surface corrugations simulating the bark of a tree. A ladder-stand connected to the tower can be easily disconnected from the tower to serve as a leaning tree stand. Lower windows provide a view of the surroundings from a seated position and smaller peep windows above the lower windows provide a view from a standing position. The lower windows slide to cover the window opening in a closed position and completely uncover the window opening in a fully open position, and can be maintained at selective positions between the fully closed and fully open positions. A flexible cable having a control knob located between the windows opens and closes the windows without noise or visible arm movement. The domed roof has a rain channel formed therein to capture and direct rain water downwardly and outwardly between the windows. One or more swivel chairs movably mounted in the enclosure are capable of revolving 360° about the center of the enclosure such that each chair can be selectively positioned closely adjacent the interior side wall of the blind to provide maximum leg room within the blind and provide the chair occupant quick and convenient access to each window in a seated position.

BRIEF DESCRIPTION OF THE DRAWINGS

FIGS. 5 and 5A are perspective views of a portion of a panel showing sliding window assemblies.

FIG. 6 is a perspective view of a window shade which may be attached to the sliding window.

DESCRIPTION OF THE PREFERRED EMBODIMENT

Figure 1:
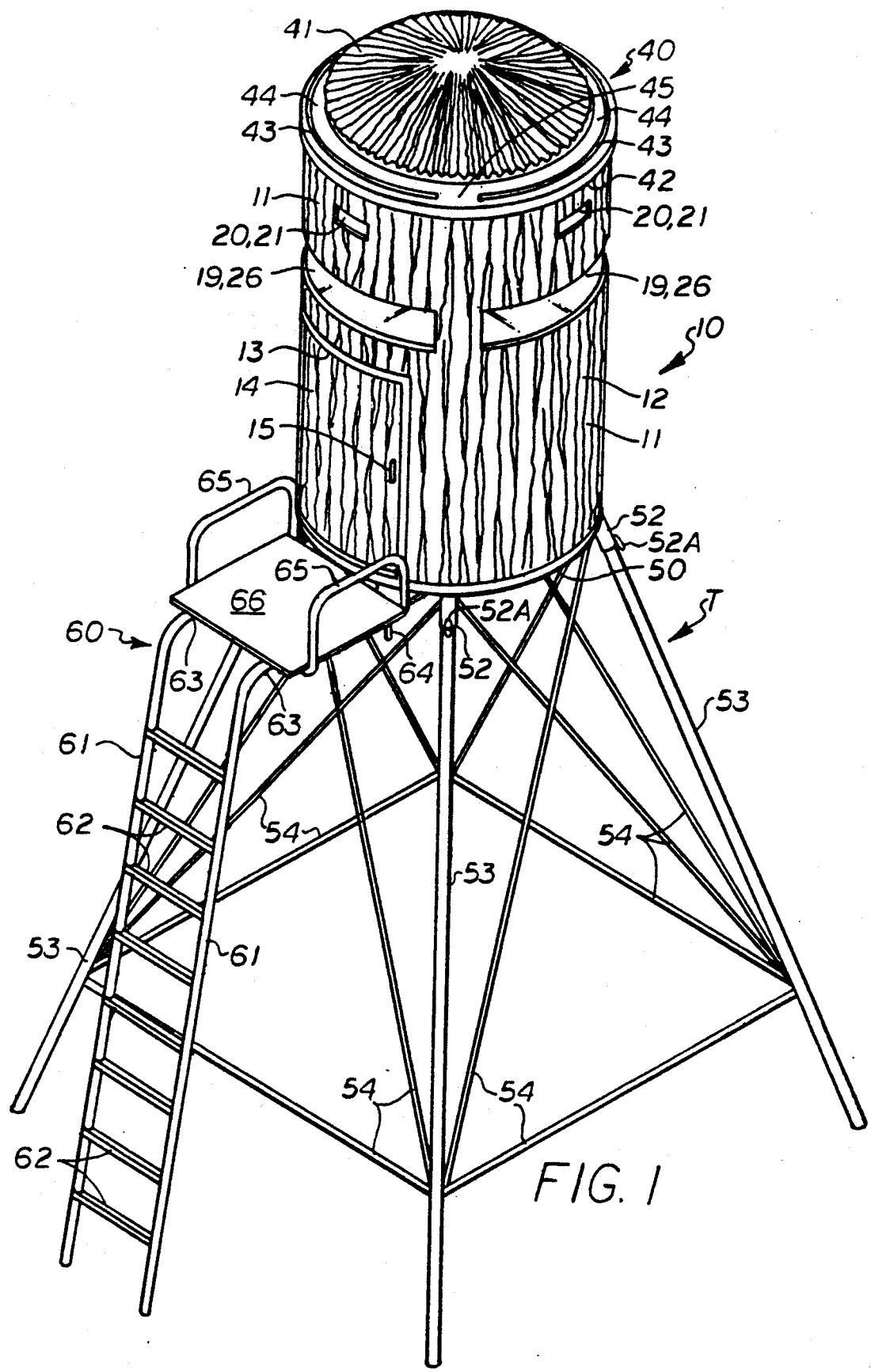
FIG. 1 is an isometric view of a cylindrical hunting blind in accordance with the present invention shown mounted on a tower which has a ladder-stand removably connected thereto.
Figure 2:
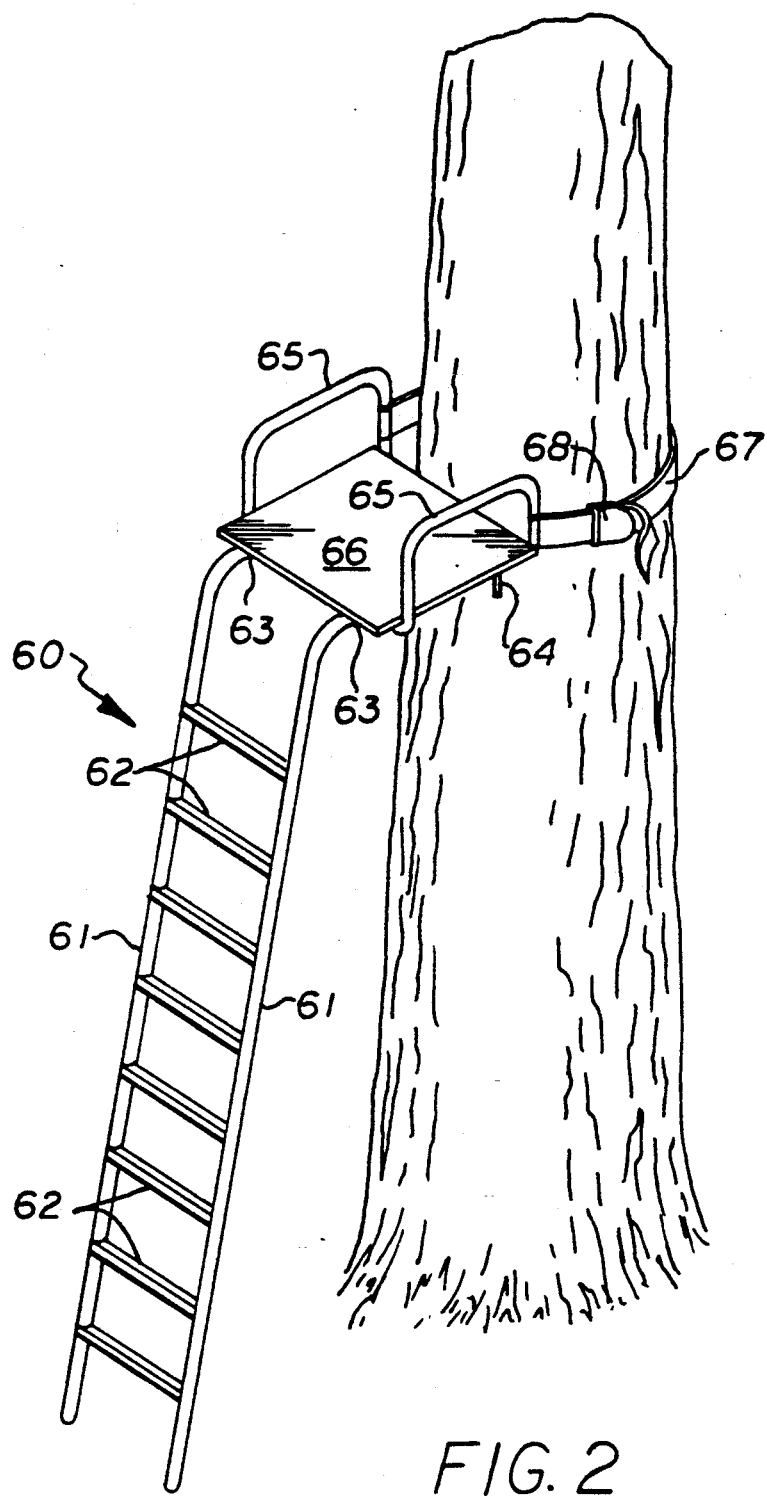
FIG. 2 is an isometric view of the ladder-stand disconnected from the tower and used as a leaning tree stand.
Figure 3:
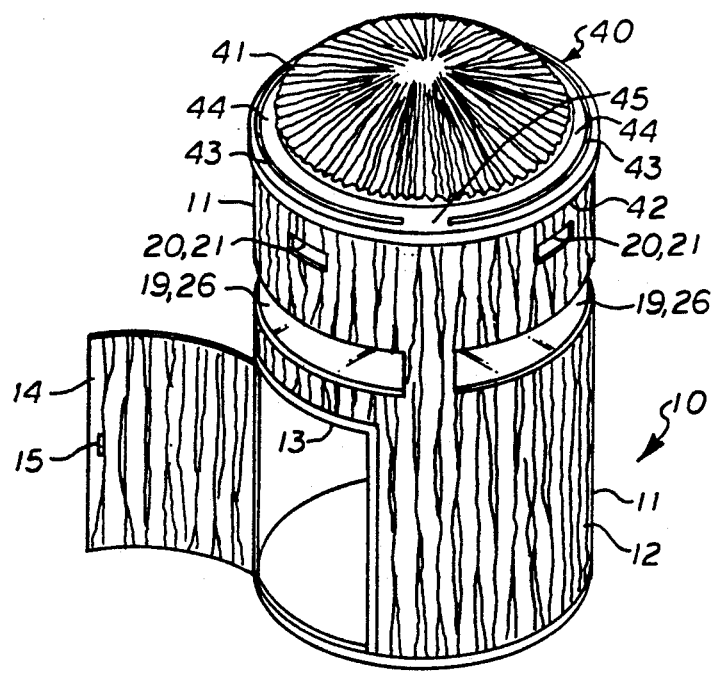
FIG. 3 is an exploded isometric view of the hunting blind and the ladder-stand disconnected from the tower.
Figure 3:
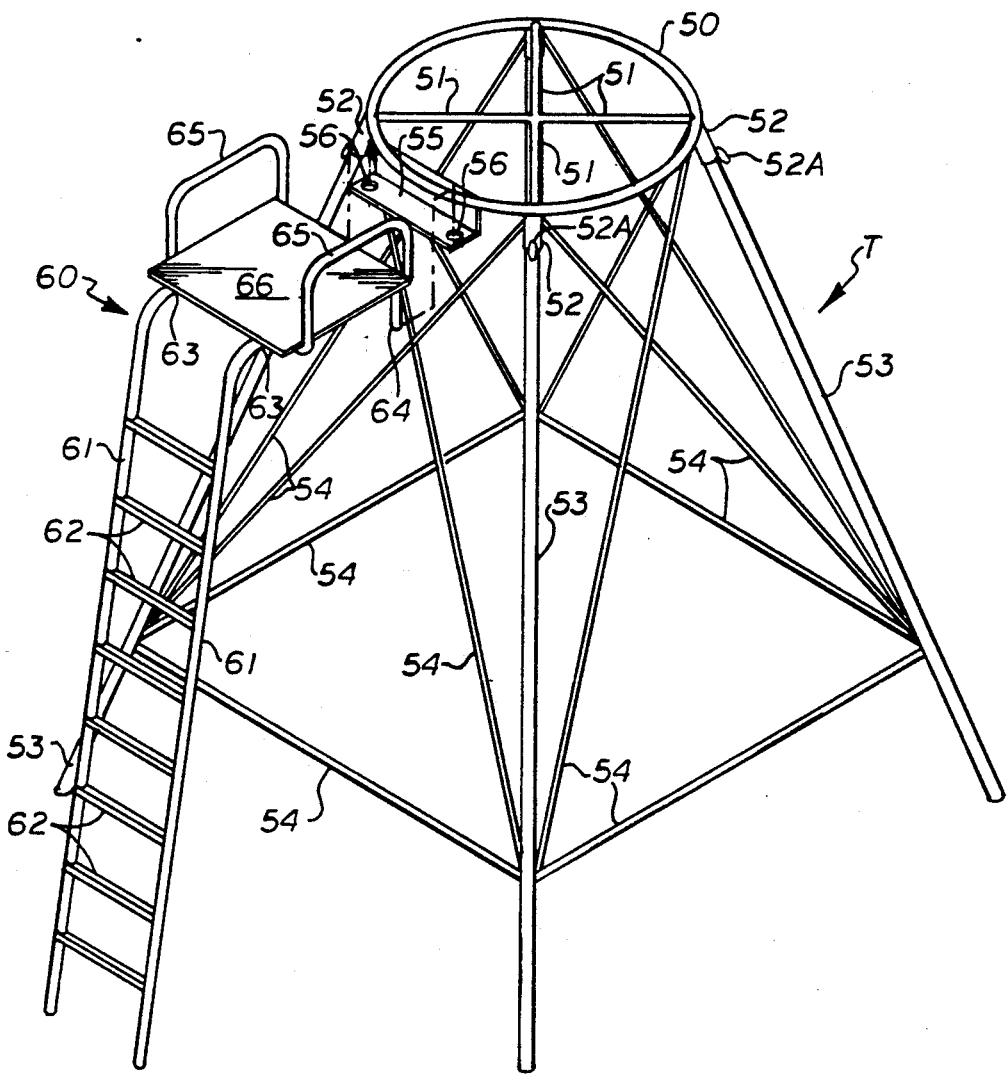

Referring to the drawings by numerals of reference, there is shown in FIGS. 1 and 3, a preferred hunting blind 10 which may be mounted on the ground or may be secured to a tower T. A detachable ladder-stand 60 is releasably connected to the tower T to provide for entry and egress to the blind. As seen in FIG. 2, the ladder-stand 60 can be disconnected from the tower T to serve as a leaning tree stand. The ladder-stand 60 can also be removed from the tower T when the blind 10 is not occupied to prevent unauthorized use of the blind.

Figure 4:
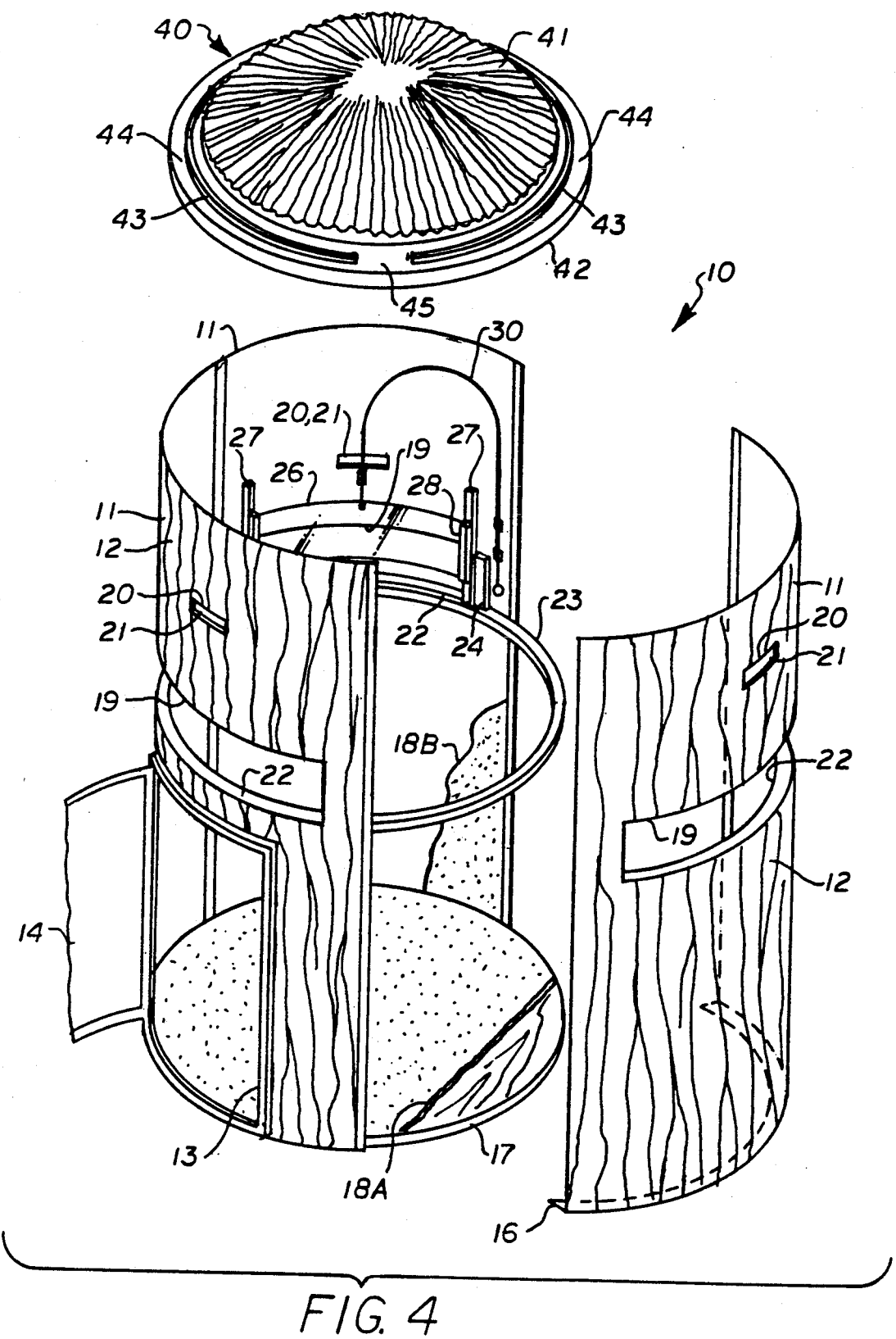
FIG. 4 is an exploded isometric view of the cylindrical hunting blind in accordance with the present invention.

Referring additionally to FIGS. 4 through 6, the blind 10 is formed of a series of elongate arcuate curved panels 11 which are secured together along their longitudinal side edges to create a cylindrical configuration. The arcuate panels 11 are molded of marine grade high impact plastic. In a preferred embodiment, the panels 11 have ridges and depressions, or corrugations 12 molded into the surface which simulate the bark and texture of a tree. The molded bark pattern corrugations 12 extend generally vertically and function as reinforcing ribs to strengthen the structure in addition to serving as camouflage for the blind. One of the panels 11 has a door opening 13. A door 14 is hingedly connected at the door opening and has a door handle 15 which can be opened from the inside or outside and may be provided with a lock.

As best seen in FIG. 4, each panel 11 is formed with a curved inwardly facing flange 16 at its bottom end. The panels 11 are secured to a circular wooden floor 17 by screwing the flanges to the underside of the floor or by other conventional fastening means. Carpet 18A or other suitable floor covering may be installed on the top surface of the floor 17. A layer of thermally insulating material 18B may also be installed on the interior surface of the panels 11 for the comfort of the occupant(s).

Each panel has a curved rectangular lower window opening 19 formed therein with a curved inwardly facing flange 19A at the bottom of the opening. A smaller, relatively narrow, rectangular peep window opening 20 is formed above the lower window opening 19. A plexiglass window 21 covers each peep window opening 20. A resilient seal member 22 is installed on the inwardly facing flange 19A at the bottom of the larger lower window opening 19.

The panels 11 are assembled around a metal reinforcing ring 23 of square cross section. The reinforcing ring 23 is mounted horizontally against the interior surface of the panels 11 beneath the inwardly facing flange 19A at the bottom of the window opening 19. A vertical mounting strip 24 is secured adjacent the lateral sides of each window opening 19. A spring clip 25 mounted at the lower end of each mounting strip 24 secures the reinforcing ring 23 in position beneath the window line. The seal member 22 which is installed on the inwardly facing flange 19A at the bottom of the window opening 19 is wider than the ring 23 and also serves as a padded gun rest. The reinforcing ring 23 is located approximately half-way between the top and bottom ends of the panels 11 and provides support for the panels and reinforces the structure against side loads.

As best seen in FIG. 5, an arcuate curved rectangular window 26 is mounted on the interior of each panel 11 for vertical sliding movement relative to the lower window opening 19. A slide channel or track 27 is secured to each mounting strip 24 at the sides of each window opening 19 and extends vertically upward from the top of the reinforcing ring 23 and terminates a distance above the window opening. The slide tracks 27 contain ball bearings and a glide member mounted therein (not shown) which travels on the bearings. A rigid rectangular frame strip 28 is secured at each lateral side edge of the curved window 26 and the frame strip is secured to the glide members of the slide track 27 such that the window will slide vertically and silently on the bearings.

Alternatively, as seen in FIG. 5A, the curved rectangular windows 26 may be slidably mounted on guide rods 27A secured on the interior of each panel 11. The guide rods 27A are secured at the sides of each window opening 19 and extend vertically upward from the top of the reinforcing ring 23 and terminate a distance above the window opening. A pair of glide brackets 28A formed of low friction material are secured at each lateral side edge of the curved window 26 and are slidably received on the respective guide rod 27A such that the window will slide vertically and silently on the guide rods. The glide brackets 28A may be apertured to provide slight frictional engagement with the guide rods 27 to allow the window to be positioned at any desired height without sliding down accidentally. Optionally, a seal member or magnet 28B may be provided in combination with the glide brackets to allow the window to be positioned at any desired height without sliding down accidentally.

A push-pull sheathed cable 30 is mounted by brackets 31 in the interior of each panel 11 and its inner cable or wire 32 is attached to the top end of the curved window 26. The other end of the inner wire 32 is connected to a control rod 33 provided with a knob 34. The control rod and knob are mounted at the side of the window opening such that they may be operated without being seen from the outside of the enclosure. The windows 26 are raised and lowered by pushing or pulling on the knob 34 and the friction between the inner wire 32 and its outer sheath is sufficient to allow the window to be positioned at any desired height without sliding down accidentally. In other words, the window 26 may be placed and maintained at selective vertical positions between the fully opened and fully closed position. In the fully open position the bottom of the window 26 is above the top of the window opening 19 and in the fully closed position the bottom edge of the window is sealingly engaged on the resilient seal 22.

The sliding window arrangement and control cable at the side of the window allows the windows to be opened and closed without noise or excessive arm movement which could be heard or seen by animals. Because the ball bearing slide tracks 27 or guide rods 27A, and cables 30 are disposed inside the enclosure, they are protected from debris and exposure to the elements which would otherwise hamper or prevent smooth and quiet operation.

In the preferred embodiment, the curved windows 26 are formed of clear acrylic plastic, and a set of thin plastic clip-on tinted window shades 35 (FIG. 6) having clips 36 on their upper edge are provided such that they can be quickly and easily installed and removed from the windows 26 when desired. The clear acrylic windows 26 allow good vision during prime hunting times when the visibility is poor because of the low light conditions, for example just after daylight and just before sundown. The tinted clip-on window shades 35 may be used at other times to prevent sun from blinding the hunter and to prevent animals from seeing into the blind.

Referring again to FIGS. 1, 3, and 4, a circular domed roof 40 is received on the open top end of the assembled panels 11. The domed roof 40 is also molded of marine grade high impact plastic and, in the preferred embodiment, has ridges and depressions or corrugations 41 molded into the surface which simulate the bark and texture of a tree. The molded bark pattern surface corrugations 41 extend generally radially outward from the center of the dome and function as reinforcing ribs to strengthen the roof structure and prevent damage from top loads, snow, birds, etc. A layer of thermally insulating material (not shown) may also be installed on the interior surface of the roof 40.

The outer periphery of the domed roof 40 has a downwardly facing circumferential flange 42 which is secured over the top ends of the panels 11 with screws or other conventional fastening means. A circular raised ridge or lip 43 is formed on the top surface of the roof radially spaced from the ends of the corrugations 41 and defines a channel 44 at the outer ends of the corrugations. The lip 43 is segmented at circumferentially spaced locations and the portions of the channel 44 between the segments form a series of downwardly angled channels 45 approximately six inches wide. The circular channel 44 serves as a rain gutter, and the channel portions 45 between the segments serve as downspouts. The channel portions 45 are spaced circumferentially to be located vertically above and between each window opening 19 when the roof is assembled onto the panels 11. The bark pattern corrugations 41 in the roof surface direct rain water into the circular channel 44 and the channel portions 45 direct the water run-off downwardly and outwardly between the windows 26.

The blinds 10 are preferably made in two sizes, both of which allow the occupant to assume a comfortable standing position. A one-person blind is approximately four foot in diameter, six foot five inches in height and is made of three panels to provide three windows. A two-person blind is approximately six foot in diameter, six foot ten inches in height and is made of four panels to provide four windows. The lower window openings 19 are formed in the panels at a convenient height to provide visibility while in a seated position and the peep window opening 20 above the lower windows is formed at a convenient height to allow the occupant to stand up stretch their legs and still be able to see out without having to bend or duck-down and make extra movement.

In an embodiment of the blind utilizing three panels 11, three circumferentially spaced window openings 19 and windows 26 are provided. In this arrangement, a solid wall is disposed diametrically opposite each window which will prevent light from going straight through the blind. Thus, a person standing or moving about inside the blind will not be silhouetted by backlighting when observed through a window.

Referring again to FIGS. 1 and 3, the tower T is of round or square tubular construction and has a circular support ring 50 at the top end with tubular cross members 51 secured radially across its interior diameter. The towers T are preferably supplied in either five, ten, or fifteen foot heights. The support ring 50 is of sufficient diameter and width to receive the circular floor 17 and support the blind 10. The cross members 51 extend beneath the bottom of the wooden floor 17 of the blind 10 and the floor is secured to the cross members by bolts extending through the floor and cross members.

A series of tubular leg sockets 52 formed of round or square tubing are secured to the support ring 50 and extend downwardly and outwardly therefrom and slidably receive the upper ends of round or square tubular leg members 53. The upper ends of the leg members 53 are secured into the leg sockets 52 by bolts or jamb nuts and extend angularly downward and outward from the support ring 50. The tower legs are provided with cross bracing 54 conventional in the art of tower construction. A rectangular L-shaped angle plate 55 is secured to the support ring 50 and extends a short distance downwardly and outwardly therefrom. The horizontal surface of the plate 55 is located below the door 14 of the blind and is provided with a pair of holes 56 (FIG. 3).

An anchoring package (not shown) which includes conventional cables, turnbuckles, and anchor rods, is provided for each blind to anchoring the blind 10 to the ground with cables. Link members 52A installed on the tubular leg sockets 52 allow cables to be attached at one end to the link members to extend angularly downward and outward therefrom with the lower end of each cable secured to an anchor rod driven or screwed into the ground. The blind may also be anchored by attaching the cables lower ends of the cables to a central anchor rod driven or screwed into the ground directly beneath the center of the floor. The cables can be tensioned by turnbuckles installed on the cables.

Referring again to FIGS. 1, 2, and 3, the detachable ladder-stand 60 is of tubular construction and has a pair of parallel side legs 61 with a series of longitudinally spaced tubular rungs 62 secured transversely therebetween. The rungs 62 are preferably formed of square tubing and covered with a weather resistant non-skid material to prevent slipping. The upper ends of the ladder-stand legs are bent somewhat perpendicular to the lower portion to form a platform support portion 63 and the terminal ends of the platform support portion is bent downwardly to form a pair of short legs 64. The short legs 64 are slidably received in the holes 56 of the plate 55 secured to the tower support ring 50. A pair of inverted, generally U-shaped, safety grab bars or hand rails 65 are secured to the platform support portion 63 of the ladder-stand 60.

A wooden platform or landing 66 is secured to the platform support portion 63 of the ladder-stand 60 and is of sufficient length and width to allow the door 24 to swing open without requiring a person to lean backward to open the door. From the foregoing description it can be seen that the ladder-stand 60 can be lifted and lowered down to place the short legs 64 into the holes 56 in the plate 55. In this position it serves as a ladder to provide for entry and egress to the blind. The ladder-stand 60 can be lifted upward to disengage the short legs 64 from the holes 56 and then removed from the tower T and transported to another location to serve as a leaning tree stand or to prevent unauthorized persons from using the blind.

As seen in FIG. 2, when the ladder-stand 60 is used as a leaning tree stand, a belt member 67 is connected to the hand rails or to the platform. The belt 67 is of sufficient length to encircle the trunk of a tree and the belt is provided with a conventional ratchet type latch mechanism 68, so that the platform 66 may be firmly secured to the tree trunk.

Figure 7:
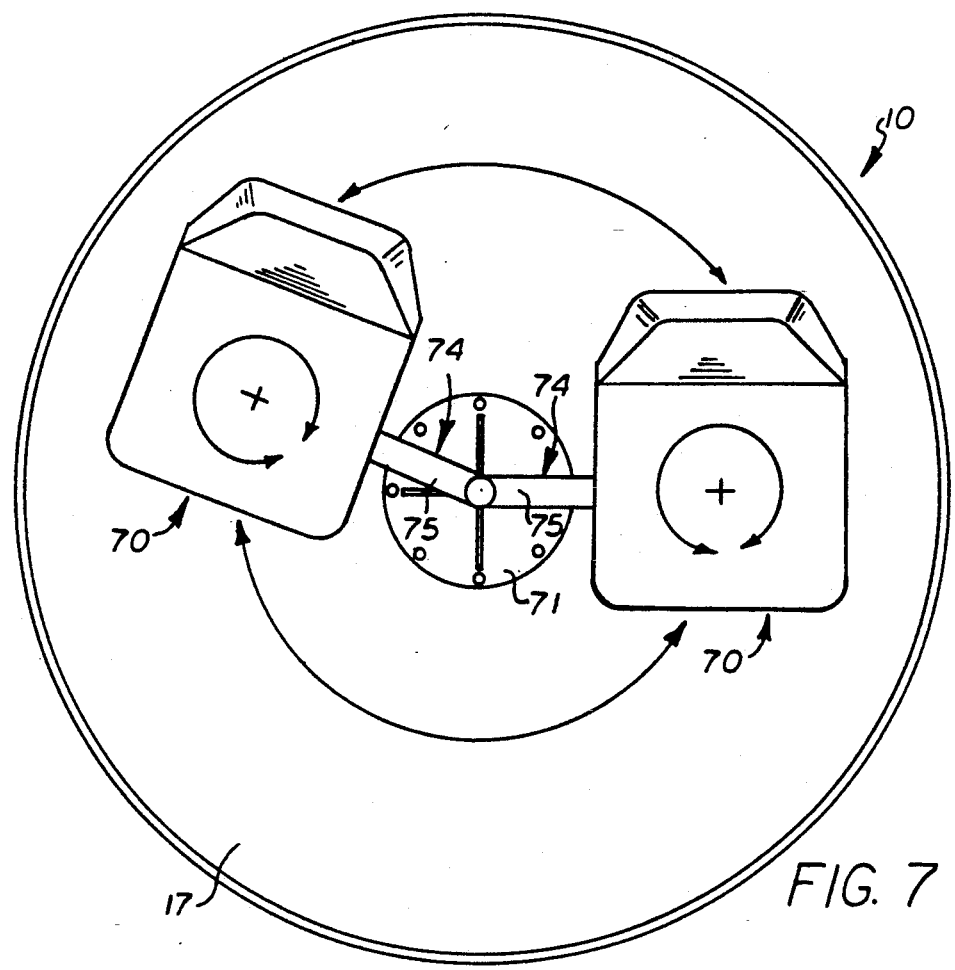
FIG. 7 is a top plan view of the interior of the blind illustrating the revolving and rotating seating arrangement.
Figure 8:
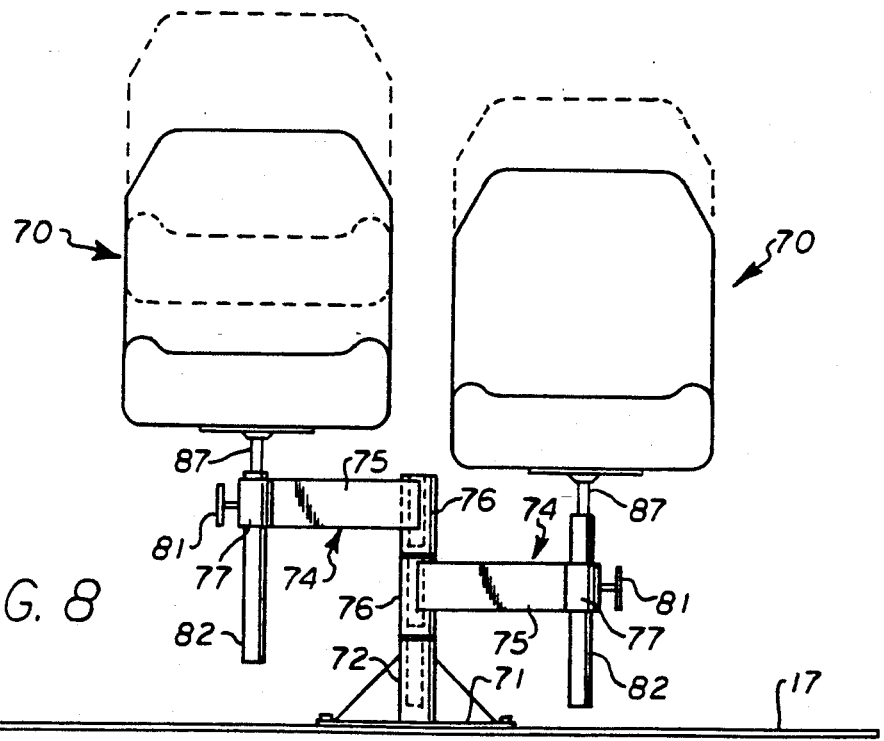
FIG. 8 is a front elevation of the seating arrangement illustrating the height adjustment.
Figure 9:
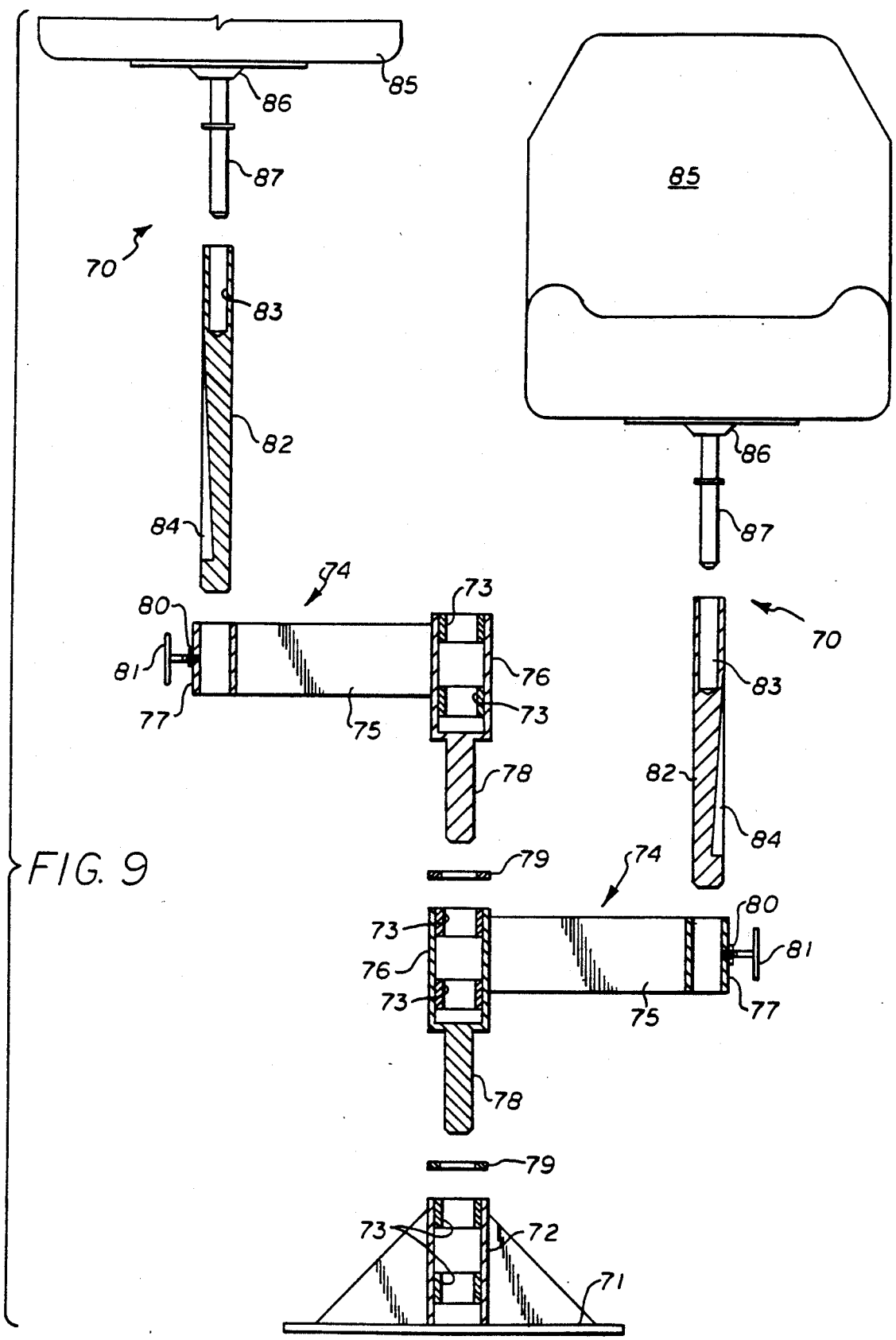
FIG. 9 is an exploded elevation view of the seating components in an unassembled condition.

Referring now to FIGS. 7, 8, and 9, the blind 10 is provided with one or more swivel chair assemblies 70 on the interior. The swivel chair assembly 70 has a base plate 71 located at the approximate center of the floor 17 which is bolted to the floor or, in the case of a tower mounted blind, the bolts extend through the floor and cross members 51 of the tower ring 50. The base plate 71 has a central tubular portion 72 which extends vertically upward reinforced by gussets and is provided with internal brass bushings 73. A swing arm 74 has a horizontal rectangular plate 75 with a first tubular member 76 secured to one end and a second tubular member 77 secured at the opposite end. The tubular members 76 are provided with internal brass bushings 73. The first tubular member 76 has a depending pin portion 78 of reduced diameter which is received in the tubular portion 72 of the base plate 71 and slidably and rotatably engaged with the internal brass bushings 73. The pin portion 78 extends through a brass washer 79 which resides between the top of the base plate tubular portion 72 and the bottom of the tubular member 76.

The second tubular member 77 has a threaded nut 80 secured over a hole through its side wall which threadedly receives the threaded shank of an adjustment handle 81. A height adjustment rod 82 has a longitudinal bore 83 at its top end and a longitudinal keyway 84 on its exterior which tapers upwardly and outwardly toward the top end. The height adjustment rod 82 is slidably received through the second tubular member 77. The height adjustment rod 82 is vertically adjustable relative to the second tubular member 77 and can be locked at various selective heights by turning the adjustment handle 81 to firmly engage the shank of the handle against the keyway 84.

The chair seat 85 has a swivel bottom connection 86 with a depending pin portion 87 which is slidably and rotatably received in the longitudinal bore 83 of the height adjustment rod 82. The upwardly and outwardly tapered keyway 84 will prevent the chair from accidently slipping when supporting weight.

Optionally, a second seat assembly having the previously described swing arm with first and second tubular members, adjustment rod, and chair seat may be installed in and supported by the single base plate 71 at the center of the blind. The second arm assembly is installed by sliding the depending pin portion 78 of its first tubular member 76 into the top end of the first tubular member 76 of the previously installed chair assembly. A brass washer 79 is installed on the pin portion 78 of the second chair assembly to reside between the stacked tubular members 76.

The swing arm 74 carrying the chair seat 85 will revolve 360° around the base plate 71 and the chair seat 85 will rotate 360° relative to the swing arm 74. The brass bushings 73 prevent squeaking and provide for smooth movement between the moving parts. In the double seating system, each chair assembly can move independently of the other. The swing arm 74 allows the chair(s) to be placed closely adjacent the side wall of the blind and gives the maximum amount of leg room within the interior of the enclosure. Thus, the seating system allows the occupant to quickly and quietly position himself or herself within the blind and within easy access to a window.

While this invention has been described fully and completely with special emphasis upon a preferred embodiment, it should be understood that within the scope of the appended claims the invention may be practiced otherwise than as specifically described herein.

I claim:

1. A cylindrical hunting blind for concealing the presence of an occupant comprising;
   an upright hollow cylindrical enclosure having top and bottom ends and a circular side wall formed of elongate rectangular arcuate panels joined together along adjacent longitudinal side edges and of sufficient height to allow an occupant to assume a standing position,
   a domed roof attached to the top end of said cylindrical enclosure,
   a floor attached to the bottom end of said cylindrical enclosure,
   a door opening in said circuit side wall having a door movably mounted therein,
   at least one window opening formed in said circular side wall intermediate said top and bottom ends,
   a pair of vertical track members mounted on said circular side wall in laterally opposed relation adjacent each said window opening.
   at least one window closely conforming to the curvature of said circular side wall slidably mounted on said track members for smooth and quiet vertical sliding movement to cover said window opening in a fully closed position and to completely uncover said window opening in a fully open position, and capable of being positioned at selective vertical positions between the fully closed and fully open positions.

2. A cylindrical hunting blind according to claim 1 including
   a layer of thermally insulating material on the interior surfaces of said enclosure.

3. A cylindrical hunting blind according to claim 1 in which
   said elongate arcuate panels are molded panels having surface corrugations molded therein to simulate the bark of a tree, and
   said domed roof is formed of molded material having surface corrugations molded therein to simulate the bark of a tree.

4. A cylindrical hunting blind according to claim 3 in which
   said domed roof has a peripheral depending flange secured over the top end of said enclosure,
   the corrugations molded in said roof extending generally radially from the center, and
   a segmented circular channel formed in the top surface of said domed roof radially spaced from the outer ends of said corrugations with the spaces between said channel segments positioned vertically above and between adjacent said window openings, whereby
   said bark pattern corrugations direct rain water into said circular channel and the spaces between said channel segments direct the rain water downwardly and outwardly between adjacent said window openings.

5. A cylindrical hunting blind according to claim 1 including;
   a rigid circular reinforcing ring secured horizontally on the interior of said enclosure intermediate the top and bottom ends thereof, and
   said arcuate panels are secured to said rigid reinforcing ring.

6. A cylindrical hunting blind according to claim 1 including;
   resilient seal means on each said window opening to engage each said window in a sealing relation while allowing sliding movement thereof.

7. A cylindrical hunting blind according to claim 1 in which;
   each said track member is a sliding track assembly having bearings between the sliding members to provide smooth and quiet sliding movement of each said window.

8. A cylindrical hunting blind according to claim 1 in which;
each said track member includes a bracket slidably mounted on rod members to provide smooth and quiet sliding movement of each said window.

9. A cylindrical hunting blind according to claim 1 in which
there are a plurality of said window openings and windows arranged in circumferentially spaced relation offset from one another such that no two windows are disposed diametrically opposite one another to prevent a line of sight straight through the blind through two windows whereby
an occupant standing or moving about inside the blind will not be silhouetted by back-lighting when observed through a window.

10. A cylindrical hunting blind according to claim 1 including;
window control means operatively connected to each said window for moving said window between the open and closed positions,
said window control means having a manual operator disposed at a location within the enclosure remote from said window such that an occupant can manipulate said manual operator to open or close said window without being seen through said window opening.

11. A cylindrical hunting blind according to claim 10 in which;
said window control means comprises a sheathed flexible cable having an inner cable with one end connected to a said window and having a push-pull control know at the other end for moving said window between the open and closed positions,
said push-pull knob mounted on the interior side wall of said enclosure between adjacent said window openings.

12. A cylindrical hunting blind according to claim 1 in which;
each said window is formed of clear transparent material, and including
at least one clip-on window shade formed of thin transparent tinted material conforming to the shape of said clear transparent window and having clip means thereon for selective releasable attachment to said clear transparent window.

13. A cylindrical hunting blind according to claim 1 in which
said at least one window opening is formed in said circular side wall intermediate said top and bottom ends at a height to allow the occupant to see out of said cylindrical enclosure in a sitting position, and including
at least one narrow rectangular peep window opening formed in said circular side wall at a height to allow the occupant to see out of said cylindrical enclosure in a standing position, and
a narrow rectangular peep window formed of transparent material covering each said peep window opening.

14. A cylindrical hunting blind according to claim 1 including;
a tower assembly of tubular construction having a circular support ring at its top end of sufficient diameter and cross section to engage and support said enclosure floor thereon and a plurality of circumferentially spaced tubular leg socket members each secured at one end to said support ring and the opposite ends of each extending angularly downward and outward therefrom, said enclosure floor being secured to said support ring and
a plurality of elongate tubular leg members each having one end slidably received and releasably secured in a respective said leg socket member and their opposite ends extending angularly downward and outward therefrom to support said enclosure above the ground surface.

* * * * *